US012506843B2

(12) United States Patent
Lindmark

(10) Patent No.: US 12,506,843 B2
(45) Date of Patent: Dec. 23, 2025

(54) PROVIDING LIGHTING ADJUSTMENT IN A VIDEO CONFERENCE

(71) Applicant: Google LLC, Mountain View, CA (US)

(72) Inventor: Stefan Lindmark, Östhammar (SE)

(73) Assignee: Google LLC, Mountain View, CA (US)

( * ) Notice: Subject to any disclaimer, the term of this patent is extended or adjusted under 35 U.S.C. 154(b) by 253 days.

(21) Appl. No.: 18/197,659

(22) Filed: May 15, 2023

(65) Prior Publication Data

US 2024/0388674 A1    Nov. 21, 2024

(51) Int. Cl.
| | |
|---|---|
| *H04N 7/15* | (2006.01) |
| *G06F 3/04845* | (2022.01) |
| *G06V 10/50* | (2022.01) |
| *G06V 10/60* | (2022.01) |
| *H04N 7/14* | (2006.01) |

(52) U.S. Cl.
CPC ......... *H04N 7/152* (2013.01); *G06F 3/04845* (2013.01); *G06V 10/507* (2022.01); *G06V 10/60* (2022.01); *H04N 7/147* (2013.01)

(58) Field of Classification Search
CPC .......... H04N 7/152; H04N 7/147; H04N 7/15; G06F 3/04845; G06V 10/507; G06V 10/60; G09G 5/10
USPC ......... 348/14.12, 14.03, 14.02, 14.08, 14.09, 348/14.1, 14.77, 14.78
See application file for complete search history.

(56) References Cited

U.S. PATENT DOCUMENTS

| | | | |
|---|---|---|---|
| 11,457,271 B1 * | 9/2022 | Faulkner | H04N 7/152 |
| 2012/0299980 A1 * | 11/2012 | Fujikawa | H04W 52/027 345/690 |
| 2016/0225301 A1 * | 8/2016 | Scepanovic | G09G 3/20 |
| 2020/0184925 A1 * | 6/2020 | Huang | G06T 5/94 |

(Continued)

OTHER PUBLICATIONS

International Search Report and Written Opinion for International Application No. PCT/US2024/029300, mailed Sep. 10, 2024, 15 pages.

*Primary Examiner* — Duc Nguyen
*Assistant Examiner* — Carissa A Jones
(74) *Attorney, Agent, or Firm* — Lowenstein Sandler LLP

(57) ABSTRACT

Systems and methods for providing lighting adjustment in a video conference are provided. A user interface (UI) comprising a plurality of UI elements and a plurality of visual items is provided for presentation on a first client device of a plurality of client devices of a plurality of participants of a video conference, each visual item corresponding to a video stream of one of a plurality of video streams from the plurality of client devices of the plurality of participants of the video conference. A first brightness level for the plurality of visual items and a second brightness level for the plurality of UI elements are determined. In response to determining that the first brightness level for the plurality of visual items and the second brightness level for the plurality of UI elements do not satisfy a target brightness criterion, it is determined that the first brightness level for the plurality of visual items and the second brightness level for the plurality of UI elements do not satisfy a threshold brightness tolerance. An adjustment is performed to each of the first brightness level for the plurality of visual items and the second brightness level for the plurality of UI elements to reach a target brightness level associated with the target brightness criterion.

20 Claims, 5 Drawing Sheets

(56) References Cited

U.S. PATENT DOCUMENTS

2022/0130022 A1    4/2022  Li et al.
2023/0334631 A1*  10/2023  Campbell .............. G06N 3/084

* cited by examiner

PROVIDING LIGHTING ADJUSTMENT IN A VIDEO CONFERENCE

TECHNICAL FIELD

Aspects and implementations of the present disclosure relate to providing lighting adjustment in a video conference.

BACKGROUND

Video conferences can take place between multiple participants via a video conference platform. A video conference platform includes tools that allow multiple client devices to be connected over a network and share each other's audio (e.g., the voice of a user recorded via a microphone of a client device) and/or video stream (e.g., a video captured by a camera of a client device, or video captured from a screen image of the client device) for communication. In some instances, the video conference platform can require adequate lighting in a video conference in order for participants to be able to see and communicate with each other during the video conference.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a computer-implemented method that includes providing, for presentation on a first client device of a plurality of client devices of a plurality of participants of a video conference, a user interface (UI) comprising a plurality of UI elements and a plurality of visual items. Each visual item corresponds to a video stream of one of a plurality of video streams from the plurality of client devices of the plurality of participants of the video conference. A first brightness level for the plurality of visual items and a second brightness level for the plurality of UI elements are determined. In response to determining that the first brightness level for the plurality of visual items and the second brightness level for the plurality of UI elements do not satisfy a target brightness criterion, it is determined that the first brightness level for the plurality of visual items and the second brightness level for the plurality of UI elements do not satisfy a threshold brightness tolerance. An adjustment to each of the first brightness level for the plurality of visual items and the second brightness level for the plurality of UI elements is performed to reach a target brightness level associated with the target brightness criterion.

In some implementations, to determine the first brightness level for the plurality of visual items, the method includes determining, for each visual item, a brightness level associated with each pixel of the visual item, wherein each pixel comprises a plurality of subpixels each corresponding to a red-green-blue (RGB) color; and computing a sum of brightness levels associated with individual subpixels of the visual item.

In some implementations, to determine the second brightness level for the plurality of UI elements, the method includes determining, for each UI element, a brightness level associated with each pixel of the UI element, wherein each pixel comprises a plurality of subpixels each corresponding to a red-green-blue (RGB) color; and computing a sum of brightness levels associated with individual subpixels of the UI element.

In some implementations, the method further includes determining, at an initial frame of the video conference, an initial brightness level for the plurality of visual items, and an initial brightness level for the plurality of UI elements; and determining, based on the initial brightness level for the plurality of visual items and the initial brightness level for the plurality of UI elements, the target brightness level.

In some implementations, to determine that the first brightness level for the plurality of visual items and the second brightness level for the plurality of UI elements do not satisfy the threshold brightness tolerance, the method further includes determining a difference in a sum of the first brightness level for the plurality of visual items and the second brightness level for the plurality of UI elements and the target brightness level; and determining that the difference is less than the threshold brightness tolerance.

In some implementations, to perform the adjustment to the second brightness level for the plurality of UI elements, the method includes selecting one or more candidate colors for the plurality of UI elements based on the difference in the sum of the first brightness level for the plurality of visual items and the second brightness level for the plurality of UI elements and the target brightness level.

In some implementations, the method further includes sending a notification to a participant of the video conference to increase a brightness level associated with a display of a client device associated with the participant.

An aspect of the disclosure provides a system including a memory device and a processing device communicatively coupled to the memory device. The processing device performs operations including providing, for presentation on a first client device of a plurality of client devices of a plurality of participants of a video conference, a user interface (UI) comprising a plurality of UI elements and a plurality of visual items. Each visual item corresponds to a video stream of one of a plurality of video streams from the plurality of client devices of the plurality of participants of the video conference. A first brightness level for the plurality of visual items and a second brightness level for the plurality of UI elements are determined. In response to determining that the first brightness level for the plurality of visual items and the second brightness level for the plurality of UI elements do not satisfy a target brightness criterion, it is determined that the first brightness level for the plurality of visual items and the second brightness level for the plurality of UI elements do not satisfy a threshold brightness tolerance. An adjustment to each of the first brightness level for the plurality of visual items and the second brightness level for the plurality of UI elements is performed to reach a target brightness level associated with the target brightness criterion.

In some implementations, to determine the first brightness level for the plurality of visual items, the processing device performs operations including determining, for each visual item, a brightness level associated with each pixel of the visual item, wherein each pixel comprises a plurality of subpixels each corresponding to a red-green-blue (RGB) color; and computing a sum of brightness levels associated with individual subpixels of the visual item.

In some implementations, to determine the second brightness level for the plurality of UI elements, the processing device performs operations including determining, for each UI element, a brightness level associated with each pixel of the UI element, wherein each pixel comprises a plurality of subpixels each corresponding to a red-green-blue (RGB) color; and computing a sum of brightness levels associated with individual subpixels of the UI element.

In some implementations, the processing device performs operations further including determining, at an initial frame of the video conference, an initial brightness level for the plurality of visual items, and an initial brightness level for the plurality of UI elements; and determining, based on the initial brightness level for the plurality of visual items and the initial brightness level for the plurality of UI elements, the target brightness level.

In some implementations, to determine that the first brightness level for the plurality of visual items and the second brightness level for the plurality of UI elements satisfy the threshold brightness tolerance, the processing device performs operations further including determining a difference in a sum of the first brightness level for the plurality of visual items and the second brightness level for the plurality of UI elements and the target brightness level; and determining that the difference is less than the threshold brightness tolerance.

In some implementations, to perform the adjustment to the second brightness level for the plurality of UI elements, the processing device performs operations including selecting one or more candidate colors for the plurality of UI elements based on the difference in the sum of the first brightness level for the plurality of visual items and the second brightness level for the plurality of UI elements and the target brightness level.

In some implementations, the processing device performs operations further including sending a notification to a participant of the video conference to increase a brightness level associated with a display of a client device associated with the participant.

An aspect of the disclosure provides a computer program including instructions that, when the program is executed by a processing device, cause the processing device to perform operations including providing, for presentation on a first client device of a plurality of client devices of a plurality of participants of a video conference, a user interface (UI) comprising a plurality of UI elements and a plurality of visual items. Each visual item corresponds to a video stream of one of a plurality of video streams from the plurality of client devices of the plurality of participants of the video conference. A first brightness level for the plurality of visual items and a second brightness level for the plurality of UI elements are determined. In response to determining that the first brightness level for the plurality of visual items and the second brightness level for the plurality of UI elements do not satisfy a target brightness criterion, it is determined that the first brightness level for the plurality of visual items and the second brightness level for the plurality of UI elements do not satisfy a threshold brightness tolerance. An adjustment to each of the first brightness level for the plurality of visual items and the second brightness level for the plurality of UI elements is performed to reach a target brightness level associated with the target brightness criterion.

In some implementations, to determine the first brightness level for the plurality of visual items, the processing device performs operations including determining, for each visual item, a brightness level associated with each subpixel of the visual item, wherein the subpixel corresponds to a red-green-blue (RGB) color; and computing a sum of brightness levels associated with individual subpixels of the visual item.

In some implementations, to determine the second brightness level for the plurality of UI elements, the processing device performs operations including determining, for each UI element, a brightness level associated with each subpixel of the UI element, wherein the subpixel corresponds to an RGB color; and computing a sum of brightness levels associated with individual subpixels of the UI element.

In some implementations, the processing device performs operations further including determining, at an initial frame of the video conference, an initial brightness level for the plurality of visual items, and an initial brightness level for the plurality of UI elements; and determining, based on the initial brightness level for the plurality of visual items and the initial brightness level for the plurality of UI elements, the target brightness level.

In some implementations, to determine that the first brightness level for the plurality of visual items and the second brightness level for the plurality of UI elements satisfy the threshold brightness tolerance, the processing device performs operations further including determining a difference in a sum of the first brightness level for the plurality of visual items and the second brightness level for the plurality of UI elements and the target brightness level; and determining that the difference is less than the threshold brightness tolerance.

In some implementations, to perform the adjustment to the second brightness level for the plurality of UI elements, the processing device performs operations including selecting one or more candidate colors for the plurality of UI elements based on the difference in the sum of the first brightness level for the plurality of visual items and the second brightness level for the plurality of UI elements and the target brightness level.

In some implementations, the processing device performs operations further including sending a notification to a participant of the video conference to increase a brightness level associated with a display of a client device associated with the participant.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
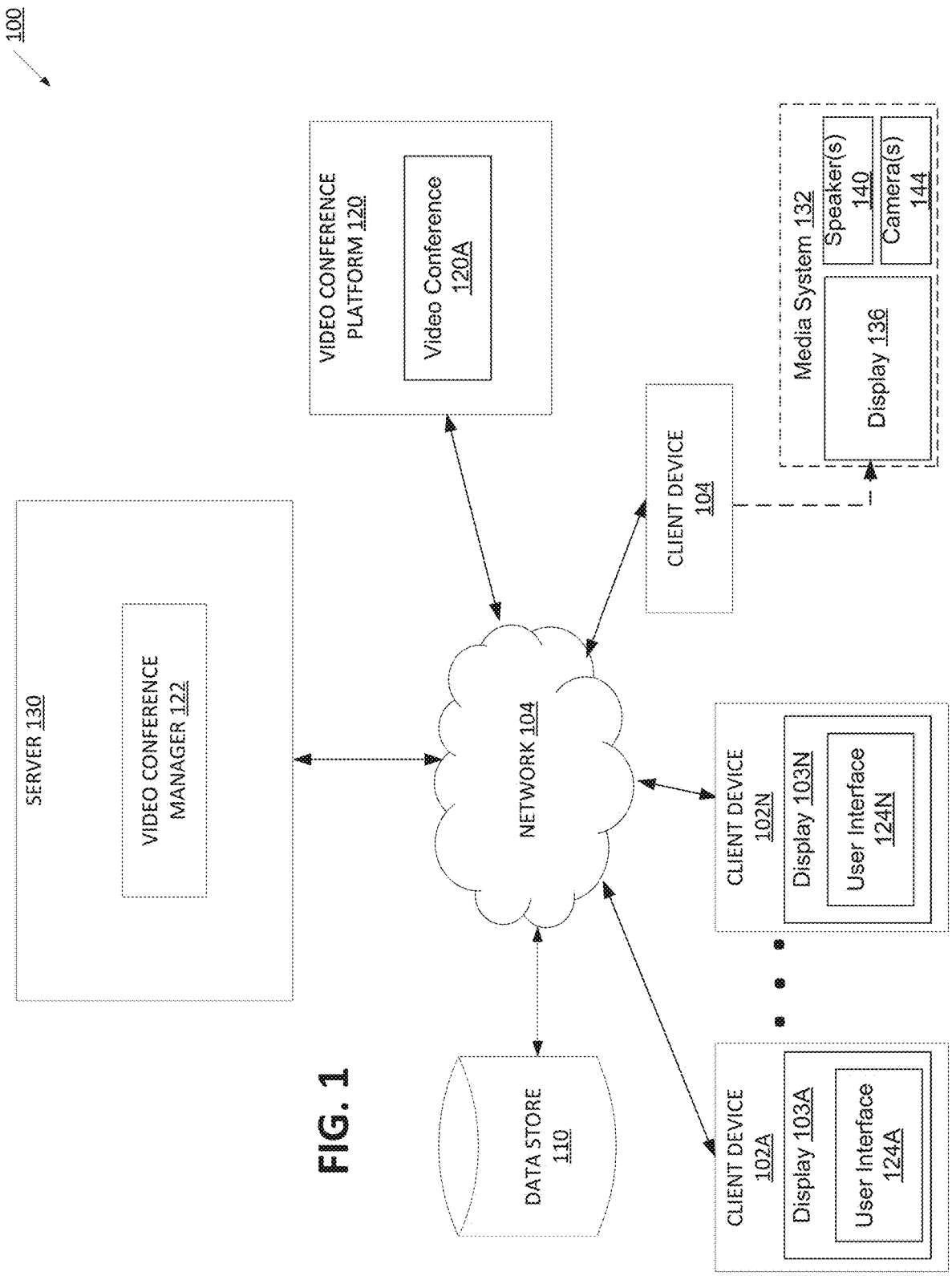
FIG. 1 illustrates an example system architecture, in accordance with implementations of the present disclosure.

Aspects of the present disclosure relate to providing lighting adjustment in a video conference of a video conference platform. A video conference platform can enable video-based conferences between multiple participants via respective client devices that are connected over a network and share each other's audio (e.g., the voice of a user recorded via a microphone of a client device) and/or video streams (e.g., a video captured by a camera of a client device) during a video conference. In some instances, a video conference platform can enable a significant number of client devices (e.g., up to one hundred or more client devices) to be connected via the video conference.

Typically, a video conference platform requires adequate lighting in a video conference in order for participants to be able to see and communicate with each other (e.g., present on a topic) during the video conference. Adequate lighting can be a challenge for participants, such as participants in low-light situations who have limited light sources. Obtaining adequate lighting in a video conference often necessitates participants to use external resources or additional hardware, such as lamps or ring lights. However, such external sources typically need to be purchased and connected to a power source. Further, they can be unavailable or inconvenient to use during the video conference, broken, not working due to a power outage, or too expensive.

Some existing video conference platforms can provide a user interface (UI) to each client device connected to the video conference, where the UI displays the video streams of each participant shared over the network in a display of each client device. In some instances, the display of a client device can be used as a light source during a video conference. For example, in a client device such as a laptop or mobile device, a display technology such as LED (Light Emitting Diode) is used to emit light and display images. In an LED display, a layer of LED lights is used to emit colored light, where each LED light is turned on or off to create the desired image. In particular, the light emitted from an LED is typically monochromatic (e.g., it only produces one color of light). To create a full-color display, LED displays use red-green-blue (RGB) LEDs, which are arranged in a matrix of pixels. Each pixel in an LED display includes three sub-pixels, one for each RGB color (red, green, and blue). By varying the brightness of each sub-pixel, the LED display can create a wide range of colors. To control the brightness and color of each sub-pixel, LED displays use polarizers and color filters. Each sub-pixel can have a polarizing filter that only allows light of a specific polarization to pass through. The light then passes through a color filter that only allows the light of a specific color to pass through. By combining the different colors and brightness levels of the sub-pixels, the display can create the desired color and brightness for each pixel. However, although a display of a client device can be used as a light source, the display is typically not a strong or focused light source even at its brightest setting because the brightness of the display can depend on the brightness and/or color of the image being displayed. For example, darker images can filter out more of the LED lights than brighter images. In some instances, the brightness or color of the video streams of participants of the video conference can also vary over time, which can result in different amounts of light being emitted from the display of the client device. This can lead to a flickering or unnatural appearance (e.g., a display of a blue presentation can add a "blueish" tint to a participant's face) of a participant of the client device.

In some existing video conference platforms, along with displaying the video streams of each participant, the UI can also display a set of UI elements, such as a set of objects displayed in the UI that allow for user interactions during the video conference, including icons, buttons, text fields, and sliders. In some instances, video conference platforms can adopt a theme for the UI elements, such as a brightness or color scheme for the UI elements. For example, some existing video conference platforms use a "night mode" theme, which uses darker colors for the UI elements in the UI. As described above, darker colors can filter out more of the LED lights than brighter images, which can result in less light being emitted through the display of the client device.

Implementations of the present disclosure address the above and other deficiencies by providing lighting adjustments to the UI elements and visual items corresponding to video streams displayed in a UI of a video conference. The brightness level for each of the visual items corresponding to the video streams and the brightness level for each of the UI elements can be determined. In response to determining that the brightness level for each of the visual items corresponding to the video streams and the brightness level for each of the UI elements are below a target brightness level and are outside of a threshold brightness tolerance (e.g., are too bright or not bright enough), adjustments can be performed to each of the brightness levels so that the brightness levels can reach the target brightness level. For example, the adjustments can include adjusting the brightness levels of the UI elements and the visual items corresponding to the video streams to be brighter colors rather than darker colors. The adjustments can also include adjusting the layout of the visual items corresponding to the video streams to provide for more bright areas in the UI, such as moving the visual items corresponding to the video streams closer together (e.g., so that there is less space between each visual item corresponding to each video stream displayed in the UI), moving the visual items corresponding to the video streams towards the middle of the screen to add more bright areas in the UI towards the edge of the display (e.g., similar to how ring lights include bright lights around the edges of the display), displaying the visual items corresponding to the video streams in smaller regions in the UI, displaying fewer visual items corresponding to video streams in the UI, displaying the UI in a full screen mode to avoid displaying UI elements that could use darker color schemes, and/or using an additional display monitor for the purpose of a light source to add more light to the UI. Further, the brightness levels for the visual items corresponding to the video streams and the UI elements can be determined and adjustments can be performed periodically throughout the video conference (e.g., at every n display frame during the video conference) to take into account fluctuations and/or variations in the brightness level of the visual items corresponding to the video streams during the video conference. Further, the colors of the UI elements can be determined and adjustments can be performed periodically throughout the video conference (e.g., at every n display frame during the video conference) to take into account fluctuations and/or variations in colors from the visual items corresponding to the video streams during the video conference.

Aspects of the present disclosure provide technical advantages over previous solutions. Aspects of the present disclosure can provide an additional functionality to the video conference tool of the video conference platform that improves the lighting quality in a video conference such that participants can communicate with each other more effectively and without having to rely on external sources or additional hardware. Further, the video conference platform can use the display of the client device itself for providing lighting adjustment, thus resulting in more efficient use of processing resources utilized to facilitate the connection between client devices by avoiding consumption of computing resources needed to support participants manually adjusting the lighting settings during the video conference.

FIG. 1 illustrates an example system architecture 100, in accordance with implementations of the present disclosure. The system architecture 100 (also referred to as "system" herein) includes client devices 102A-N, one or more client devices 104, a data store 110, a video conference platform 120, and a server 130, each connected to a network 104.

In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. A data item can include audio data and/or video stream data, in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by video conference platform 120 or one or more different machines (e.g., the server 130) coupled to the video conference platform 120 via network 104. In some implementations, the data store 110 can store portions of audio and video streams received from the client devices 102A-102N for the video conference platform 120. Moreover, the data store 110 can store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents may be shared with users of the client devices 102A-102N and/or concurrently editable by the users. In some implementations, the data store 110 can store one or brightness levels of visual items and/or UI elements received from the client devices 102A-102N and/or determined by the server 130, as described in more detail with respect to FIG. 3.

Video conference platform 120 can enable users of client devices 102A-102N and/or client device(s) 104 to connect with each other via a video conference (e.g., a video conference 120A). A video conference (also referred to herein as a "live stream of a video conference") refers to a real-time communication session such as a video conference call, also known as a video-based call or video chat, in which participants can connect with multiple additional participants in real-time and be provided with audio and video capabilities. Real-time communication refers to the ability for users to communicate (e.g., exchange information) instantly without transmission delays and/or with negligible (e.g., milliseconds or microseconds) latency. Video conference platform 120 can allow a user to join and participate in a video conference call with other users of the platform. Embodiments of the present disclosure can be implemented with any number of participants connecting via the video conference (e.g., up to one hundred or more).

The client devices 102A-102N may each include computing devices such as personal computers (PCs), laptops, mobile phones, smart phones, tablet computers, netbook computers, network-connected televisions, etc. In some implementations, client devices 102A-102N may also be referred to as "user devices." Each client device 102A-102N can include an audiovisual component that can generate audio and video data to be streamed to video conference platform 120. In some implementations, the audiovisual component can include a device (e.g., a microphone) to capture an audio signal representing speech of a user and generate audio data (e.g., an audio file or audio stream) based on the captured audio signal. The audiovisual component can include another device (e.g., a speaker) to output audio data to a user associated with a particular client device 102A-102N. In some implementations, the audiovisual component can also include an image capture device (e.g., a camera) to capture images and generate video data (e.g., a video stream) of the captured data of the captured images.

In some embodiments, video conference platform 120 is coupled, via network 104, with one or more client devices 104 that are each associated with a physical conference or meeting room. Client device(s) 104 may include or be coupled to a media system 132 that may comprise one or more display devices 136, one or more speakers 140 and one or more cameras 144. Display device 136 can be, for example, a smart display or a non-smart display (e.g., a display that is not itself configured to connect to network 104). Users that are physically present in the room can use media system 132 rather than their own devices (e.g., client devices 102A-102N) to participate in a video conference, which may include other remote users. For example, the users in the room that participate in the video conference may control the display 136 to show a slide presentation or watch slide presentations of other participants. Sound and/or camera control can similarly be performed. Similar to client devices 102A-102N, client device(s) 104 can generate audio and video data to be streamed to video conference platform 120 (e.g., using one or more microphones, speakers 140 and cameras 144).

Each client device 102A-102N or 104 can include a web browser and/or a client application (e.g., a mobile application, a desktop application, etc.). In some implementations, the web browser and/or the client application can present, on a display device 103A-103N of client device 102A-102N, a user interface (UI) (e.g., a UI of the UIs 124A-124N) for users to access video conference platform 120. For example, a user of client device 102A can join and participate in a video conference via a UI 124A presented on the display device 103A by the web browser or client application. A user can also present a document to participants of the video conference via each of the UIs 124A-124N. Each of the UIs 124A-124N can include multiple regions to present visual items corresponding to video streams of the client devices 102A-102N provided to the server 130 for the video conference. Each of the UIs 124A-124N can include UI elements, including a background of the UI, buttons, icons, text fields, sliders, and other objects that can enable a user of client device 102A-102N to interact with participants of the video conference.

In some implementations, server 130 can include a video conference manager 122. Video conference manager 122 is configured to manage a video conference between multiple users of video conference platform 120. In some implementations, video conference manager 122 can provide the UIs 124A-124N to each client device to enable users to watch and listen to each other during a live stream of a video conference and/or during playback of a recording of the video conference. Video conference manager 122 can also collect and provide data associated with the video conference to each participant of the video conference. In some implementations, video conference manager 122 can provide the UIs 124A-124N for presentation by a client application (e.g., a mobile application, a desktop application, etc.). For example, the UIs 124A-124N can be displayed on a display device 103A-103N by a native application executing on the operating system of the client device 120A-120N or the client device 104. The native application may be separate from a web browser. In some embodiments, the video conference manager 122 can provide lighting adjustment in the video conference by adjusting the brightness levels and/or colors of the UI elements and visual items displayed on the display device 103A-103Ns of the UIs 124A-124N of the video conference. Further details with respect to the video conference manager 122 are described with respect to FIG. 3.

As described previously, an audiovisual component of each client device can capture images and generate video data (e.g., a video stream) of the captured data of the captured images. In some implementations, the client devices 102A-102N and/or client device(s) 104 can transmit the generated video stream to video conference manager 122. The audiovisual component of each client device can also capture an audio signal representing speech of a user and generate audio data (e.g., an audio file or audio stream) based on the captured audio signal. In some implementations, the client devices 102A-102N and/or client device(s) 104 can transmit the generated audio data to video conference manager 122. The video conference manager 122 can include a video stream processor. The video stream processor can be combined together or separated into further components, according to a particular implementation. It should be noted that in some implementations, various components of the video conference manager 122 may run on separate machines. The video stream processor can receive video streams from the client devices (e.g., from client devices 102A-102N and/or 104). In some implementations, the video stream processor can receive audio streams associated with the video streams from the client devices (e.g., from an audiovisual component of the client devices 102A-102N).

In some implementations, video conference platform 120 and/or server 130 can be one or more computing devices computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to connect with other users via a video conference. Video conference platform 120 may also include a website (e.g., a webpage) or application back-end software that may be used to enable a user to connect with other users via the video conference.

It should be noted that in some other implementations, the functions of server 130 or video conference platform 120 may be provided by a fewer number of machines. For example, in some implementations, server 130 may be integrated into a single machine, while in other implementations, server 130 may be integrated into multiple machines. In addition, in some implementations, server 130 may be integrated into video conference platform 120.

In general, functions described in implementations as being performed by video conference platform 120 or server 130 can also be performed by the client devices 102A-N and/or client device(s) 104 in other implementations, if appropriate. In addition, the functionality attributed to a particular component can be performed by different or multiple components operating together. Video conference platform 120 and/or server 130 can also be accessed as a service provided to other systems or devices through appropriate application programming interfaces, and thus is not limited to use in websites.

Although implementations of the disclosure are discussed in terms of video conference platform 120 and users of video conference platform 120 participating in a video conference, implementations may also be generally applied to any type of telephone call or conference call between users. Implementations of the disclosure are not limited to video conference platforms that provide video conference tools to users.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel, of the video conference platform 120.

In situations in which the systems discussed here collect personal information about users, or may make use of personal information, the users may be provided with an opportunity to control whether video conference platform 120 collects user information (e.g., information about a user's social network, social actions or activities, profession, a user's preferences, or a user's current location), or to control whether and/or how to receive content from the server 130 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the video conference platform 120 and/or server 130.

Figure 2A:
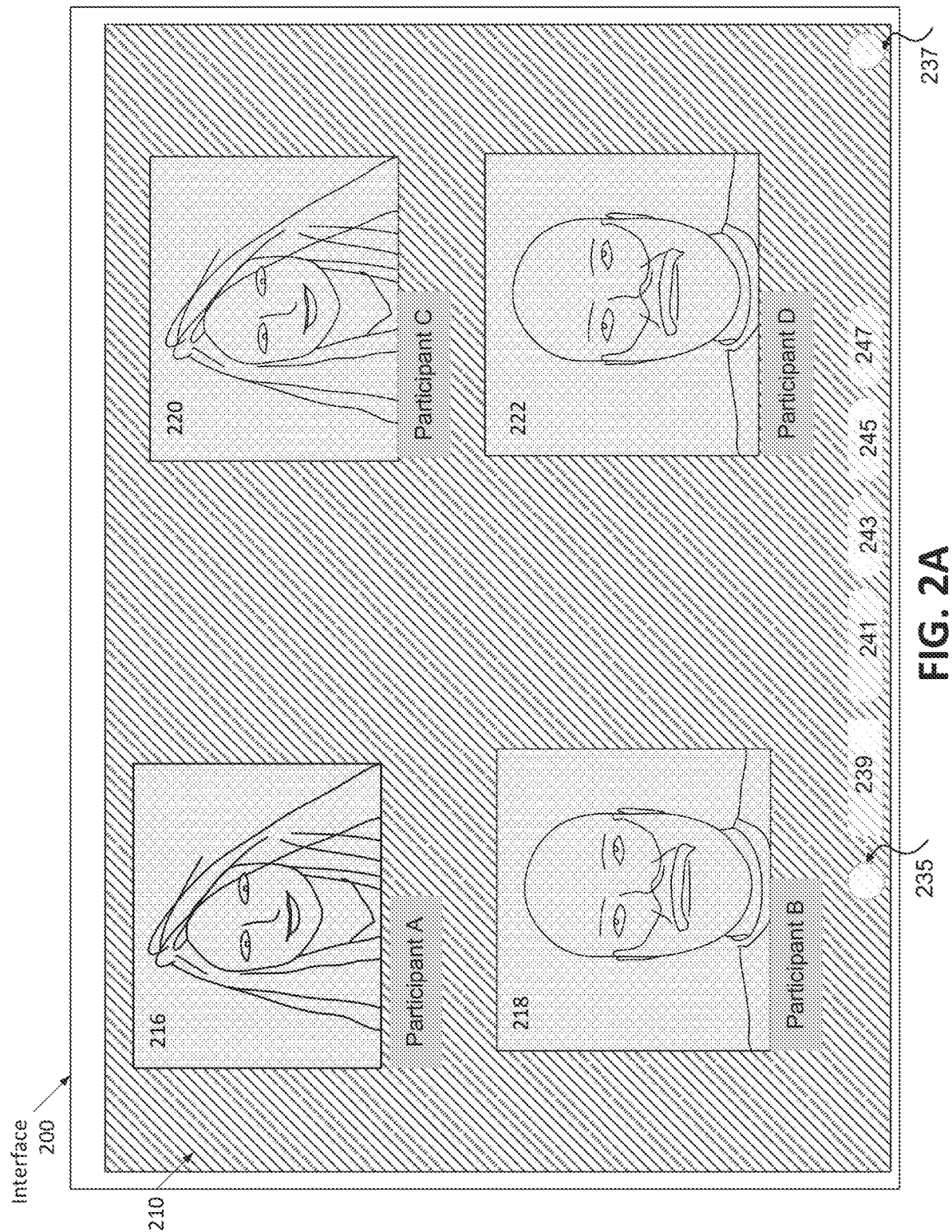
FIG. 2A illustrates an example user interface (UI) on a client device during a video conference, in accordance with implementations of the present disclosure.

FIG. 2A illustrates an example user interface 200 on a client device during a video conference, in accordance with some embodiments of the present disclosure. The UI 200 can be generated by the video conference manager 122 of FIG. 1 for presentation at a client device (e.g., client devices 102A-102N and/or 104). Accordingly, the UI 200 can be generated by one or more processing devices of the server 130 of FIG. 1. In some implementations, the video conference between multiple participants can be managed by the video conference platform 120. As illustrated, the video conference manager 122 can provide the UI 200 to enable participants (e.g., participants A, B, C, D) to join and participate in the video conference. Alternatively, the UI 200 can be generated by a client application hosted by a respective client device (e.g., client devices 102A-102N and/or 104) based on data received from the server 130.

UI 200 can include multiple regions, including a first region 216, a second region 218, a third region 220, and a fourth region 222. The first region 216 can display a visual item corresponding to video data (e.g., a video stream and/or visual item) captured and/or streamed by a client device associated with Participant A (e.g., based on an identifier associated with the client device and/or the participant). The second region 218 can display a visual item corresponding to video data (e.g., a video stream and/or visual item) captured and/or streamed by a client device associated with Participant B (e.g., based on an identifier associated with the client device and/or the participant). The third region 220 can display a visual item corresponding to video data (e.g., a video stream and/or visual item) captured and/or streamed by a client device associated with Participant C (e.g., based on an identifier associated with the client device and/or the participant). The fourth region 222 can display a visual item corresponding to video data (e.g., a video stream and/or visual item) captured and/or streamed by a client device associated with Participant D (e.g., based on an identifier associated with the client device and/or the participant). In some embodiments, the one or more visual items displayed in each region can be associated with a brightness level. For example, in the UI 200, each of the regions can be associated with a lower brightness level, indicating that the visual item corresponding to the video stream of the associated participant is darker. In some embodiments, each of the regions can be associated with a higher brightness level, indicating that the visual item corresponding to the video stream of the associated participant is brighter. In some implementations, each region is of the same or similar size as the size of each other region. In some implementations, each region can be of different sizes, e.g., one region can be of a larger size than the other regions.

In some embodiments, the UI 200 can include one or more UI elements that enable participants to interact with other participants in the video conference. For example, the one or more UI elements can include an icon, button, text field, slider, drop-down, or other objects to enable participants to interact during the video conference, such as UI elements 235, 239, 241, 243, 245, 247, 237 of FIG. 2A. In some embodiments, the one or more UI elements can include a background element of the UI (e.g., the background 210 of FIG. 2A). In some embodiments, each UI element can be associated with a brightness level and color. For example, in the UI 200, the "patterned design" illustrated in each of the UI elements 210, 235, 239, 241, 243, 245, 247, 237 can indicate a lower or higher brightness level and/or color.

Figure 2B:
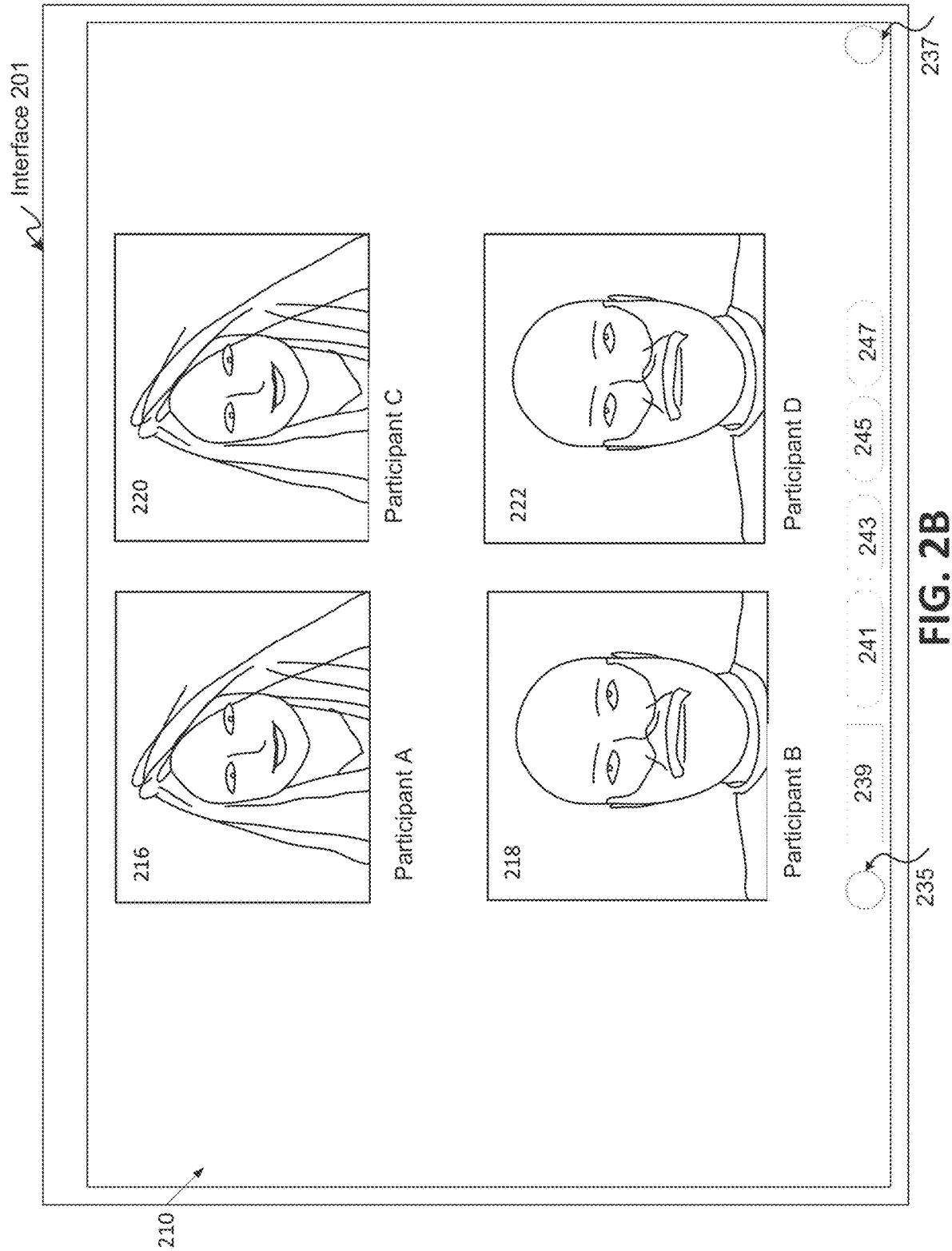
FIG. 2B illustrates an example UI on a client device during a video conference, in accordance with implementations of the present disclosure.

FIG. 2B illustrates an example UI 201 on a client device during a video conference (e.g., the video conference presented in UI 200 of FIG. 2A), in accordance with implementations of the present disclosure. The UI 201 can be generated by the video conference manager 122 (or a client application of a client device) of FIG. 1 for presentation at a client device (e.g., client devices 102A-102N and/or 104) based on the adjusted lighting (e.g., the brightness level) of the visual items and UI elements displayed in the UI 200 of FIG. 2A, as described with respect to FIG. 3. Accordingly, the UI 201 can include multiple regions, including a first region 216, a second region 218, a third region 220, and a fourth region 222. As described with respect to FIG. 2A, the one or more visual items displayed in each region can be associated with a brightness level. For example, in the UI 200, each of the regions can be associated with a lower or higher brightness level, indicating that the visual item corresponding to the video stream of the associated participant is darker or brighter. In contrast, in the UI 201, the video conference manager 122 has adjusted the brightness level of each of the visual items displayed in each region to reach a target brightness level (e.g., to be brighter or to be darker), as described in more detail with respect to FIG. 3. In some embodiments, the video conference manager 122 can adjust the brightness level of one or more of the visual items before the one or more visual items are displayed in the UI 201. In some embodiments, the video conference manager 122 can adjust the layout and/or position of each of the visual items in the UI 201 to provide for more bright areas in the UI 201. For example, each of the visual items can be displayed with less space in between each visual item (e.g., less space in between each region). In some embodiments, the position of each of the visual items can be moved towards the center of the UI. In some embodiments, each region displaying the visual items can be modified in size (e.g., the size of one or more regions can be reduced). In some embodiments, the video conference manager 122 can reduce the number of visual items being displayed in the UI 201. For example, the video conference manager 122 can display the visual items associated with only the active participants of the video conference (e.g., the participants actively speaking and/or presenting). In some embodiments, the UI 201 can be presented in a full screen display mode at the client device.

In some embodiments, the UI 201 can include one or more UI elements that enable participants to interact with other participants in the video conference, including the UI elements 210, 235, 239, 241, 243, 245, 247, 237 as illustrated in FIG. 2A. A described with respect to FIG. 2A, each UI element can be associated with a brightness level and color. For example, in the UI 200, the "patterned design" illustrated in each of the UI elements 210, 235, 239, 241, 243, 245, 247, 237 can indicate a lower or higher brightness level and/or color. In contrast, in the UI 201, the video conference manager 122 has adjusted the brightness level and/or color of each of the UI elements to reach a target brightness level (e.g., to be brighter or to be darker), as described in more detail with respect to FIG. 3. In some embodiments, the video conference manager 122 can detect an additional available monitor associated with the client device, and provide bright objects or areas to the client device with instructions to display them on the additional monitor, and thereby emit light to brighten the user interface of the video conference presented on the initial monitor (e.g., for the sole purpose of adding light to the initial monitor).

In some embodiments, the video conference manager 122 adjusts the brightness level and/or color of each of the UI elements to compensate for fluctuations in brightness levels in the visual items being rendered in the UI during the video conference. For example, the video conference manager 122 can select an initial brightness level and/or color for a background (e.g., a background 210 in FIG. 2B). In some embodiments, the initial brightness level for the background is below a maximum brightness level (e.g., to allow for adjustments to be made to the UI elements to increase the initial brightness level). In some embodiments, the video conference manager 122 can select an initial brightness level and/or color for the one or more other UI elements (e.g., the UI elements other than the background). In some embodiments, the initial brightness level for a UI element can be based on a size of the UI element. For example, a UI element with a smaller size, such as text labels, frames, icons, etc., can have an initial brightness level that is darker than a UI element with a larger size. In some embodiments, at a predefined frequency, at every rendered display frame n, the video conference manager 122 can determine (e.g., compute) a sum of the brightness levels of each UI element and each visual item. In some embodiments, the predefined frequency can be selected to take into account decreased CPU power consumption caused by determining brightness level related metrics such as the sum of the brightness levels. For example, too frequent calculation can consume too much CPU power. As such, the predefined frequency can be every n frames (e.g., every 2 or more frames), rather than each consecutive frame. In some embodiments, based on the sum of the brightness levels of each UI element and each visual item at the rendered display frame n, the video conference manager 122 can adjust the brightness level of one or more UI elements to adjust for the changes in the brightness levels from the initial brightness levels of the UI elements (e.g., to reach the target brightness level or to get within a close range of the target brightness level). In some embodiments, the video conference manager 122 can perform a partial adjustment to the brightness level of the one or more UI elements to adjust for the changes in the brightness levels from the initial brightness levels of the UI elements to avoid a large color variation in the one or more UI elements.

In some embodiments, the video conference manager 122 determines whether to adjust the brightness level and/or color of each of the UI elements and/or the brightness level of each of the visual items based on whether a user has selected a corresponding setting in a configuration UI. In some embodiments, the video conference manager 122 determines how to adjust the brightness level and/or color of each of the UI elements and/or the brightness level of each of the visual items based on a user selection of an operation mode for the above adjustments (e.g., the configuration UI can include a UI element, such as a drop down menu, toggle button, slider, etc., that allows a participant to select a lighting operation mode, such as a "dynamic mode" where the video conference manager 122 can dynamically (in response to visual changes) adjust the brightness level and/or color of each of the UI elements and/or the brightness level of each of the visual items, as described herein. In some embodiments, the participant can select a "static mode," where the brightness level and/or color of each of the UI elements and/or the brightness level of each of the visual items are adjusted statically (e.g., only in the beginning of the video conference).

Figure 3:
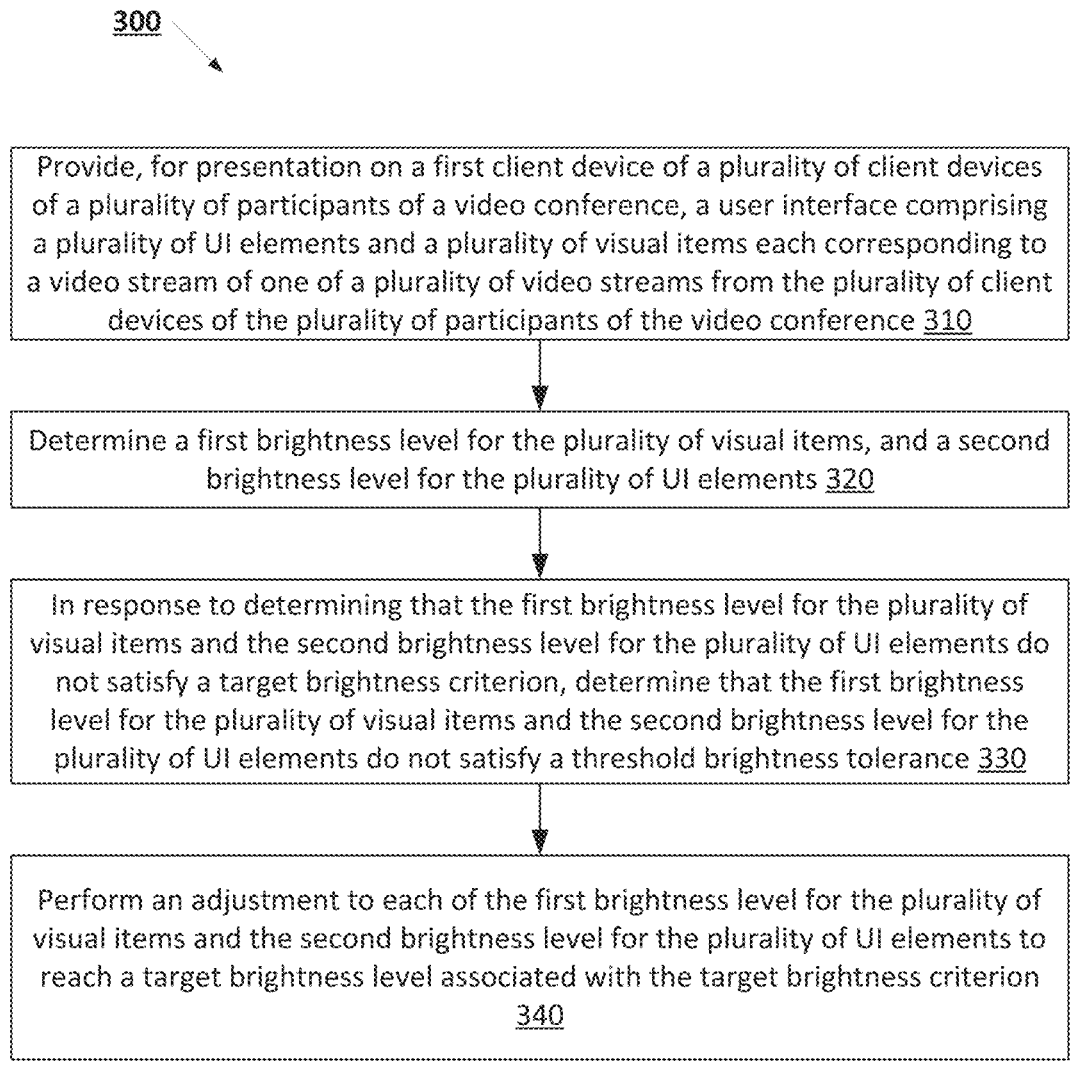
FIG. 3 depicts a flow diagram of a method for providing lighting adjustment in a video conference, in accordance with implementations of the present disclosure.

FIG. 3 depicts a flow diagram of a method 300 for providing lighting adjustment in a video conference, in accordance with implementations of the present disclosure. Method 300 may be performed by processing logic that may include hardware (circuitry, dedicated logic, etc.), software (e.g., instructions run on a processing device), or a combination thereof. In one implementation, some or all the operations of method 300 may be performed by one or more components of system 100 of FIG. 1 (e.g., video conference platform 120, server 130 and/or video conference manager 122).

For simplicity of explanation, the method 300 of this disclosure is depicted and described as a series of acts. However, acts in accordance with this disclosure can occur in various orders and/or concurrently, and with other acts not presented and described herein. Furthermore, not all illustrated acts may be required to implement the method 300 in accordance with the disclosed subject matter. In addition, those skilled in the art will understand and appreciate that the method 300 could alternatively be represented as a series of interrelated states via a state diagram or events. Additionally, it should be appreciated that the method 300 disclosed in this specification are capable of being stored on an article of manufacture (e.g., a computer program accessible from any computer-readable device or storage media) to facilitate transporting and transferring such method to computing devices. The term "article of manufacture," as used herein, is intended to encompass a computer program accessible from any computer-readable device or storage media.

At block 310, the processing logic provides, for presentation on a client device (e.g., a first client device) of a set of client devices (e.g., the client devices 120A-120N and/or 140 of FIG. 1) of a set of participants of a video conference, a user interface (UI) (e.g., a UI 124A of the UIs 124A-124N of FIG. 1).

In some embodiments, the UI includes a set of regions to display a set of visual items, where each visual item corresponds to one of a set of video streams from the set of client devices. For example, the UI can include the set of regions 216, 218, 220, 222 of FIGS. 2A-2B. In some embodiments, a video stream can correspond to a series of images captured by a camera of a client device and subsequently encoded for transmission over a network in accordance with, for example, H.264 standard. In some embodiments, the video stream can correspond to screen image data of a document presented on a display device of a client device. A document can be a slide presentation, a word document, a spreadsheet document, a web page, or any other document that can be presented. In some embodiments, each video stream can be associated with an audio stream corresponding to audio data collected by a microphone of a client device and subsequently encoded (e.g., compressed and packetized) for transmission over a network. The audio data can be encoded according to a standard such as MP3, etc. In some embodiments, each visual item can be associated with a brightness level.

In some embodiments, the UI includes a set of UI elements. In some embodiments, the one or more UI elements can include an icon, button, text field, slider, dropdown, or other objects to enable participants to interact during the video conference, such as UI elements 235, 239, 241, 243, 245, 247, 237 of FIGS. 2A-2B. In some embodiments, the one or more UI elements can include a background element of the UI (e.g., the background 210 of FIG. 2A). In some embodiments, each UI element can be associated with a brightness level and color.

At block 320, the processing logic determines a brightness level for the set of visual items and another brightness level for the set of UI elements.

In some embodiments, the processing logic can determine the brightness level for the set of visual items by measuring the relative luminance of each visual item of the set of visual items at a particular display frame of the video conference. Relative luminance is a measure from a scale of 0 to 1 of the perceived brightness of a color and can be used to determine the brightness of each pixel in a display. To determine the relative luminance of each visual item, the processing logic can determine, for each visual item, a brightness level of each pixel of the visual item, where each pixel of the visual item includes a set of subpixels that each correspond to a red-green-blue (RGB) color of an RGB color model. For example, there can be three subpixels, where one subpixel corresponds to a red color component, another subpixel corresponds to a green color component, and another subpixel corresponds to a blue color component of each pixel of the visual item. An example formula for determining the relative luminance of each visual item can be the following:

$$y = n_1 \times R + n_2 \times G + n_3 \times B,$$

where Y is the relative luminance (from 0 to 1), R is the red color component (from 0 to 255), G is the green color component (from 0 to 255), B is the blue color component (from 0 to 255), and $n_1$, $n_2$, $n_3$ are linear coefficients typically known in the art (e.g., $n_1$ can be 0.2126, $n_2$ can be 0.7152, $n_3$ can be 0.0722). For example, if a particular pixel of the visual item has an RGB value of (128, 64, 255), the processing logic can determine the relative luminance as follows: $Y=0.2126\times128+0.7152\times64+0.0722\times255$, resulting in $Y=84.68$. The resulting value of Y (84.68) represents the relative luminance of the color of the particular pixel of the visual item, which can be used as a measure of the brightness level of the particular pixel. In some embodiments, the processing logic can compute a sum of the brightness levels of the individual pixels of each visual item (e.g., by adding the relative luminance measured for each pixel of each visual item) (also referred to herein as "$C_n$").

In some embodiments, the processing logic can determine the brightness level for the set of UI elements by measuring the relative luminance of each pixel of each UI elements in a similar manner as described above with respect to determining the relative luminance of each pixel of a visual item. In some embodiments, the processing logic can compute a sum of the brightness levels of the individual pixels of each UI element (e.g., by adding the relative luminance measured for each pixel of each UI element) (also referred to herein as "$U_n$"). In some embodiments, the processing logic can compute an overall sum (also referred to herein as "$E_n$") of the sum of the brightness levels of the individual pixels of each visual item (e.g., $C_n$) and the sum of the brightness levels of the individual pixels of each UI element (e.g., $U_n$).

At block 330, the processing logic determines that the brightness level for the set of visual items and the brightness level for the set of UI elements do not satisfy a threshold brightness tolerance (also referred to herein as "T"). In some embodiments, the threshold brightness tolerance can indicate a value or range of values at which the brightness level for the set of visual items and the brightness level for the set of UI elements can be maintained (e.g., no adjustment needs to be performed to the brightness level). In some embodiments, the threshold brightness tolerance can be determined using offline testing, such as A/B testing. A/B testing, also known as split testing, can refer to a randomized experimentation process where two or more versions of a variable (e.g., a brightness level of a visual item and/or a brightness level of a UI element) are shown to different groups (e.g., groups of users) at the same time, and their performance is compared. In some embodiments, the threshold brightness tolerance can be stored at the data store 110 of FIG. 1 and can be retrieved by the processing logic (e.g., by the video conference manager 122).

In some embodiments, the processing logic determines that the brightness level for the set of visual items and the brightness level for the set of UI elements do not satisfy the threshold brightness tolerance in response to determining that the brightness level for the set of visual items and the brightness level for the set of UI elements do not satisfy a target brightness criterion. In some embodiments, the processing logic can determine that the brightness level for the set of visual items and the brightness level for the set of UI elements do not satisfy the target brightness criterion by determining that the brightness level for the set of visual items and the brightness level for the set of UI elements are below or above a target brightness level (also referred to herein as "$E_0$"). For example, a brightness level below the target brightness level can indicate that the brightness level is not bright enough. In some embodiments, a brightness level above the target brightness level can indicate that the brightness level is too bright. In some embodiments, satisfying the target brightness criterion includes reaching the target brightness level associated with the target brightness criterion. In some embodiments, the processing logic determines the target brightness level by determining, at an initial display frame of the video conference, an initial brightness level for the set of visual items (also referred to herein as "$C_0$"), and an initial brightness level for the set of UI elements (also referred to herein as "$U_0$"). The processing logic can determine the initial brightness level for the set of visual items by determining, at the initial display frame of the video conference, the brightness level of each pixel of each visual item by measuring, for example, the relative luminance of each pixel of each visual item and computing the sum of the brightness levels of the individual pixels of each visual item, as described herein at block 320. The processing logic can determine the initial brightness level for the set of UI elements by determining, at the initial display frame of the video conference, the brightness level of each pixel of each UI element by measuring, for example, the relative luminance of each pixel of each UI element and computing the sum of the brightness levels of the individual pixels of each UI element, as described herein at block 320. In some embodiments, the processing logic can determine the target brightness level based on the determined initial brightness levels for the set of visual items and the set of UI elements. For example, the target brightness level can be a value equivalent to the sum of the initial brightness level for the set of visual items and the initial brightness level for the set of UI elements. In some embodiments, the target brightness level, the initial brightness level for the set of visual items, and/or the initial brightness level for the set of UI elements can be stored at the data store 110 of FIG. 1 and can be retrieved by the processing logic (e.g., by the video conference manager 122).

In some embodiments, to determine that the brightness level for the set of visual items and the brightness level for the set of UI elements do not satisfy the threshold brightness tolerance, the processing logic can determine a difference (also referred to herein as "$E_\Delta$") in a sum of the brightness level for the set of visual items and the brightness level for the set of UI elements and the target brightness level (e.g., $E_\Delta = E_n - E_0$). If the processing logic determines that the difference is less than or equal to the threshold brightness tolerance, that can indicate that the brightness level for the set of visual items and the brightness level for the set of UI elements satisfy the threshold brightness tolerance. In response to determining that the threshold brightness tolerance is satisfied, the processing logic can maintain the brightness level or the set of visual items and the brightness level for the set of UI elements. If the processing logic determines that the difference is greater than the threshold brightness tolerance, that can indicate that the brightness level for the set of visual items and the brightness level for the set of UI elements do not satisfy the threshold brightness tolerance.

At block 340, the processing logic performs an adjustment to each of the brightness level for the set of visual items and the brightness level for the set of UI elements. In some embodiments, the processing logic performs the adjustment such that each of the brightness level for the set of visual items and the brightness level for the set of UI elements reaches the target brightness level associated with the target brightness criterion described with respect to block 330. In some embodiments, the processing logic performs the adjustment to each of the brightness level for the set of visual items and the brightness level for the set of UI elements in response to determining that the brightness level for the set of visual items and the brightness level for the set of UI elements do not satisfy the threshold brightness tolerance, as described with respect to block 330. In some embodiments, performing the adjustment to the brightness level for the set of UI elements includes selecting one or more candidate RGB colors for the set of UI elements based on the difference in the sum of the brightness level for the set of visual items and the brightness level for the set of UI elements and the target brightness level as described with respect to block 330. For example, the processing logic can select one or more candidate RGB colors for each pixel of each UI element such that an updated sum of the brightness levels of each pixel of each UI element (also referred to herein as "$U_c$") adjusts for the difference in the sum of the brightness level for the set of visual items and the brightness level for the set of UI elements and the target brightness level to reach the target brightness level (e.g., $U_c=U_0-E_A$).

In some embodiments, the processing logic can repeat the acts performed at blocks 320 to 340 at a defined frequency, e.g., to periodically perform adjustments to the brightness level for the set of visual items and the brightness level for the set of UI elements to reach the target brightness level. In some embodiments, performing the acts at blocks 320 to 340 can further include, and/or alternatively include, determining (e.g., computing) the sum of each color of each UI element of the set of UI elements (e.g., instead of determining the sum of the brightness levels, as described herein). In some embodiments, determining the sum of each color of each UI element can include computing a vector-based sum of each color of each UI element across the RGB color model. The processing logic can compare the vector-based sum of each color to the placement of each color against a white axis along a vector of values from {0,0,0} to {255, 255,255}. The processing logic can perform an adjustment to one or more colors of each UI element to reach the target brightness level, such as a resulting summed color vector that is within a close range to the white axis (e.g., to reach a neutral white hue or color to avoid throwing shades of unnatural color into a user's face, as described herein). In some embodiments, the threshold brightness tolerance can be the distance between a color vector and the neutral white axis.

In some embodiments, the processing logic can perform the adjustment by sending a notification to a participant of the video conference to increase a brightness level associated with a display of a client device (e.g., the display 103A of client device 102A of FIG. 1) associated with the participant. For example, the participant can be prompted (e.g., a dialog box can be displayed in the UI of the video conference with a message requesting the participant to increase the brightness level of the display of the client device, such as by going to the brightness level settings of the client device and increasing the brightness level).

Figure 4:
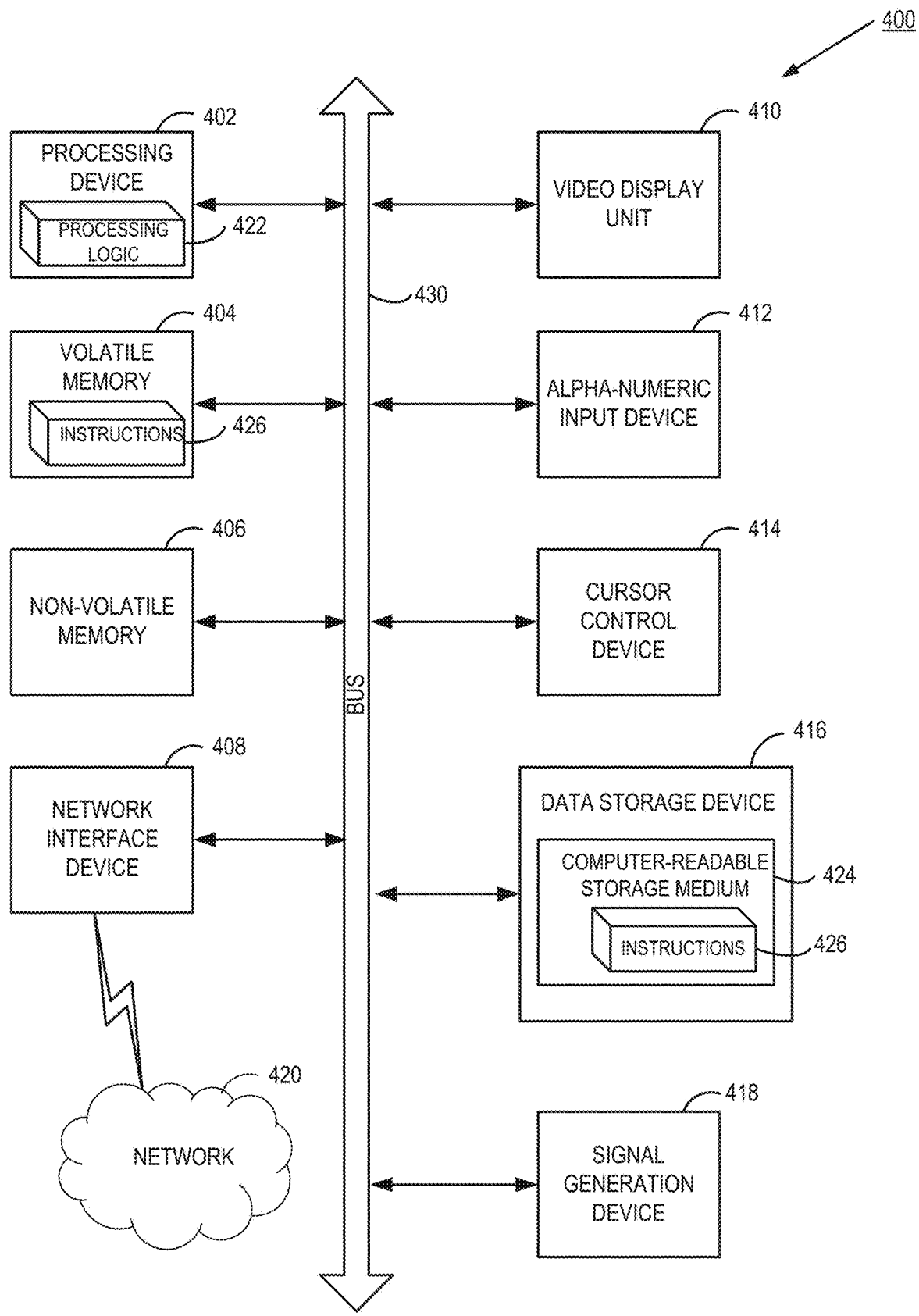
FIG. 4 is a block diagram illustrating an exemplary computer system, in accordance with implementations of the present disclosure.

FIG. 4 is a block diagram illustrating an exemplary computer system, in accordance with implementations of the present disclosure. The computer system 400 can be the server 130 or client devices 102A-N in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 416, which communicate with each other via a bus 430.

Processor (processing device) 402 represents one or more general-purpose processing devices such as a microprocessor, central processing unit, or the like. More particularly, the processor 402 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 can also be one or more special-purpose processing devices such as an application specific integrated circuit (ASIC), a field programmable gate array (FPGA), a digital signal processor (DSP), network processor, or the like. The processor 402 is configured to execute instructions 426 (e.g., for providing lighting adjustment in a video conference) for performing the operations discussed herein.

The computer system 400 can further include a network interface device 408. The computer system 400 also can include a video display unit 410 (e.g., a liquid crystal display (LCD) or a cathode ray tube (CRT)), an input device 412 (e.g., a keyboard, and alphanumeric keyboard, a motion sensing input device, touch screen), a cursor control device 414 (e.g., a mouse), and a signal generation device 418 (e.g., a speaker).

The data storage device 416 can include a non-transitory machine-readable storage medium 424 (also computer-readable storage medium) on which is stored one or more sets of instructions 426 (e.g., for providing lighting adjustment in a video conference) embodying any one or more of the methodologies or functions described herein. The instructions can also reside, completely or at least partially, within the main memory 404 and/or within the processor 402 during execution thereof by the computer system 400, the main memory 404 and the processor 402 also constituting machine-readable storage media. The instructions can further be transmitted or received over a network 420 via the network interface device 408.

In one implementation, the instructions 426 include instructions for providing interactive playback of a video conference. While the computer-readable storage medium 424 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
   providing, for presentation on a first client device of a plurality of client devices of a plurality of participants of a video conference, a user interface (UI) comprising a plurality of UI elements and a plurality of visual items each corresponding to a video stream of one of a plurality of video streams from the plurality of client devices of the plurality of participants of the video conference;
   determining a first brightness level for the plurality of visual items, and a second brightness level for the plurality of UI elements;
   determining whether the first brightness level for the plurality of visual items satisfies a target brightness criterion and a threshold brightness tolerance;
   determining whether the second brightness level for the plurality of UI elements satisfies the target brightness criterion and the threshold brightness tolerance; and
   in response to determining that the first brightness level for the plurality of visual items and the second brightness level for the plurality of UI elements fail to satisfy the target brightness criterion and the threshold brightness tolerance:
      performing an adjustment to each of the first brightness level for the plurality of visual items and the second brightness level for the plurality of UI elements to reach a target brightness level associated with the target brightness criterion.

2. The method of claim 1, wherein determining the first brightness level for the plurality of visual items comprises:
   determining, for each visual item, a brightness level associated with each pixel of the visual item, wherein each pixel comprises a plurality of subpixels each corresponding to a red-green-blue (RGB) color; and
   computing a sum of brightness levels associated with individual pixels of the visual item.

3. The method of claim 1, wherein determining the second brightness level for the plurality of UI elements comprises:
   determining, for each UI element, a brightness level associated with each pixel of the UI element, wherein each pixel comprises a plurality of subpixels each corresponding to a red-green-blue (RGB) color; and
   computing a sum of brightness levels associated with individual subpixels of the UI element.

4. The method of claim 1, further comprising:
  determining, at an initial frame of the video conference, an initial brightness level for the plurality of visual items, and an initial brightness level for the plurality of UI elements; and
  determining, based on the initial brightness level for the plurality of visual items and the initial brightness level for the plurality of UI elements, the target brightness level.

5. The method of claim 1, wherein determining that the first brightness level for the plurality of visual items and the second brightness level for the plurality of UI elements fail to satisfy the target brightness criterion and the threshold brightness tolerance further comprises:
  determining a difference in a sum of the first brightness level for the plurality of visual items and the second brightness level for the plurality of UI elements and the target brightness level; and
  determining that the difference is less than the threshold brightness tolerance.

6. The method of claim 5, wherein performing the adjustment to the second brightness level for the plurality of UI elements comprises selecting one or more candidate colors for the plurality of UI elements based on the difference.

7. The method of claim 1, further comprising:
  sending a notification to a participant of the video conference to increase a brightness level associated with a display of a client device associated with the participant.

8. A system comprising:
  a memory device; and
  a processing device coupled to the memory device, the processing device to perform operations comprising:
  providing, for presentation on a first client device of a plurality of client devices of a plurality of participants of a video conference, a user interface (UI) comprising a plurality of UI elements and a plurality of visual items each corresponding to a video stream of one of a plurality of video streams from the plurality of client devices of the plurality of participants of the video conference;
  determining a first brightness level for the plurality of visual items, and a second brightness level for the plurality of UI elements;
  determining whether the first brightness level for the plurality of visual items satisfies a target brightness criterion and a threshold brightness tolerance;
  determining whether the second brightness level for the plurality of UI elements satisfies the target brightness criterion and the threshold brightness tolerance; and
  in response to determining that the first brightness level for the plurality of visual items and the second brightness level for the plurality of UI elements fail to satisfy the target brightness criterion and the threshold brightness tolerance:
    performing an adjustment to each of the first brightness level for the plurality of visual items and the second brightness level for the plurality of UI elements to reach a target brightness level associated with the target brightness criterion.

9. The system of claim 8, wherein to determine the first brightness level for the plurality of visual items, the processing device is to perform operations comprising:
  determining, for each visual item, a brightness level associated with each pixel of the visual item, wherein each pixel comprises a plurality of subpixels each corresponding to a red-green-blue (RGB) color; and
  computing a sum of brightness levels associated with individual subpixels of the visual item.

10. The system of claim 8, wherein to determine the second brightness level for the plurality of UI elements, the processing device is to perform operations comprising:
  determining, for each UI element, a brightness level associated with each pixel of the UI element, wherein each pixel comprises a plurality of subpixels each corresponding to a red-green-blue (RGB) color; and
  computing a sum of brightness levels associated with individual subpixels of the UI element.

11. The system of claim 8, wherein the processing device is to perform operations further comprising:
  determining, at an initial frame of the video conference, an initial brightness level for the plurality of visual items, and an initial brightness level for the plurality of UI elements; and
  determining, based on the initial brightness level for the plurality of visual items and the initial brightness level for the plurality of UI elements, the target brightness level.

12. The system of claim 8, wherein to determine that the first brightness level for the plurality of visual items and the second brightness level for the plurality of UI elements fail to satisfy the target brightness criterion and the threshold brightness tolerance, the processing device is to perform operations further comprising:
  determining a difference in a sum of the first brightness level for the plurality of visual items and the second brightness level for the plurality of UI elements and the target brightness level; and
  determining that the difference is less than the threshold brightness tolerance.

13. The system of claim 12, wherein to perform the adjustment to the second brightness level for the plurality of UI elements, the processing device is to perform operations comprising:
  selecting one or more candidate colors for the plurality of UI elements based on the difference.

14. The system of claim 8, wherein the processing device is to perform operations further comprising:
  sending a notification to a participant of the video conference to increase a brightness level associated with a display of a client device associated with the participant.

15. A non-transitory computer readable storage medium comprising instructions for a server that, when executed by a processing device, cause the processing device to perform operations comprising:
  providing, for presentation on a first client device of a plurality of client devices of a plurality of participants of a video conference, a user interface (UI) comprising a plurality of UI elements and a plurality of visual items each corresponding to a video stream of one of a plurality of video streams from the plurality of client devices of the plurality of participants of the video conference;
  determining a first brightness level for the plurality of visual items, and a second brightness level for the plurality of UI elements;
  determining whether the first brightness level for the plurality of visual items satisfies a target brightness criterion and a threshold brightness tolerance;
  determining whether the second brightness level for the plurality of UI elements satisfies the target brightness criterion and the threshold brightness tolerance; and in response to determining that the first brightness level for the plurality of visual items and the second brightness level for the plurality of UI elements fail to satisfy the target brightness criterion and the threshold brightness tolerance:
  performing an adjustment to each of the first brightness level for the plurality of visual items and the second brightness level for the plurality of UI elements to reach a target brightness level associated with the target brightness criterion.

16. The non-transitory computer readable storage medium of claim 15, wherein to determine the first brightness level for the plurality of visual items, the processing device is to perform operations comprising:
  determining, for each visual item, a brightness level associated with each pixel of the visual item, wherein each pixel comprises a plurality of subpixels each corresponding to a red-green-blue (RGB) color; and
  computing a sum of brightness levels associated with individual subpixels of the visual item.

17. The non-transitory computer readable storage medium of claim 15, wherein to determine the second brightness level for the plurality of UI elements, the processing device is to perform operations comprising:
  determining, for each UI element, a brightness level associated with each pixel of the UI element, wherein each pixel comprises a plurality of subpixels each corresponding to a red-green-blue (RGB) color; and
  computing a sum of brightness levels associated with individual subpixels of the UI element.

18. The non-transitory computer readable storage medium of claim 15, wherein the processing device is to perform operations further comprising:
  determining, at an initial frame of the video conference, an initial brightness level for the plurality of visual items, and an initial brightness level for the plurality of UI elements; and
  determining, based on the initial brightness level for the plurality of visual items and the initial brightness level for the plurality of UI elements, the target brightness level.

19. The non-transitory computer readable storage medium of claim 15, wherein to determine that the first brightness level for the plurality of visual items and the second brightness level for the plurality of UI elements fail to satisfy the target brightness criterion and the threshold brightness tolerance, the processing device is to perform operations further comprising:
  determining a difference in a sum of the first brightness level for the plurality of visual items and the second brightness level for the plurality of UI elements and the target brightness level; and
  determining that the difference is less than the threshold brightness tolerance.

20. The non-transitory computer readable storage medium of claim 15, wherein the processing device is to perform operations further comprising:
  sending a notification to a participant of the video conference to increase a brightness level associated with a display of a client device associated with the participant.

* * * * *